Nov. 27, 1934.  W. A. MORTON ET AL  1,982,478
METHOD OF AND APPARATUS FOR ANNEALING GLASSWARE
Filed April 11, 1927   6 Sheets-Sheet 1
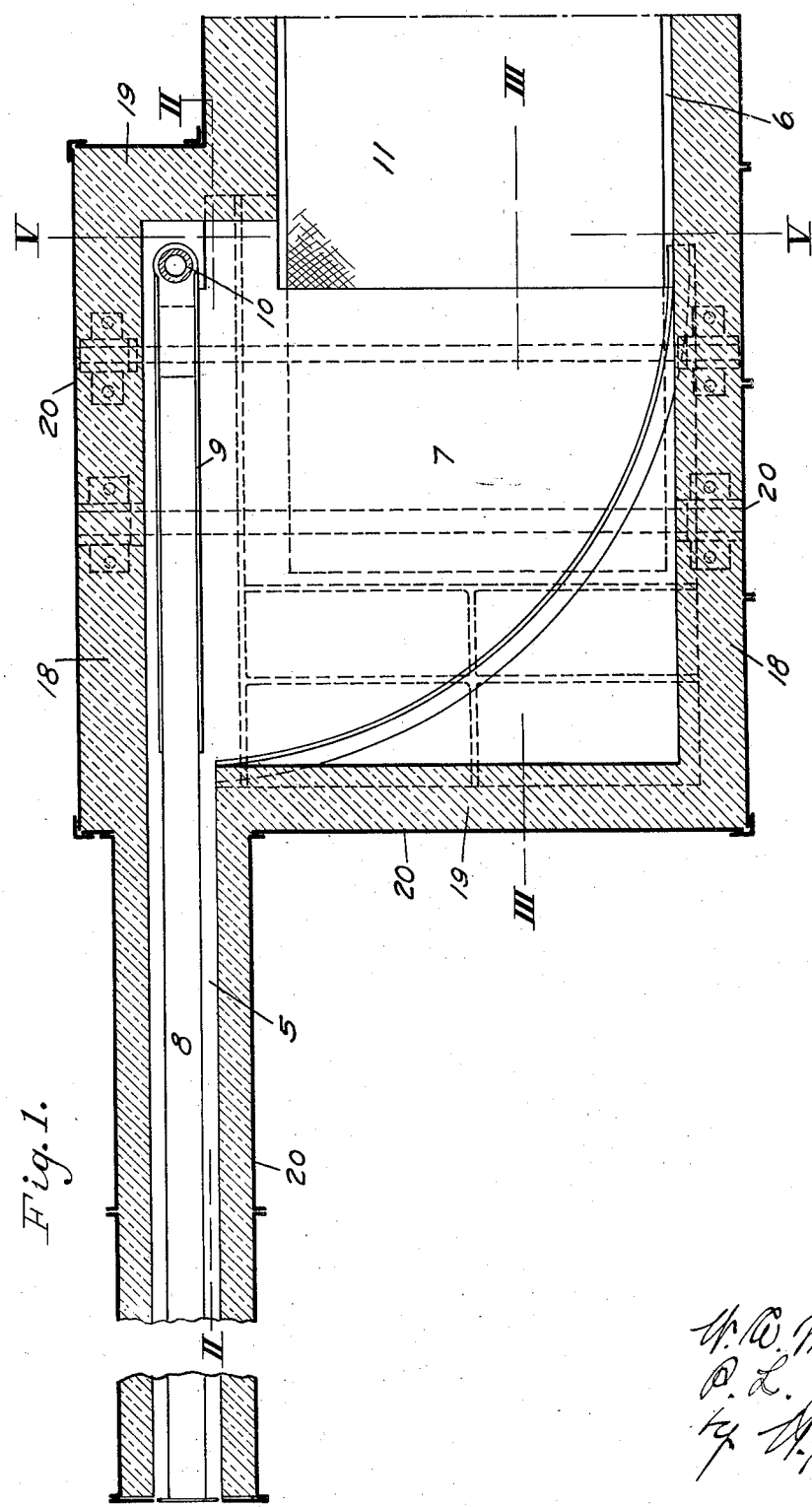

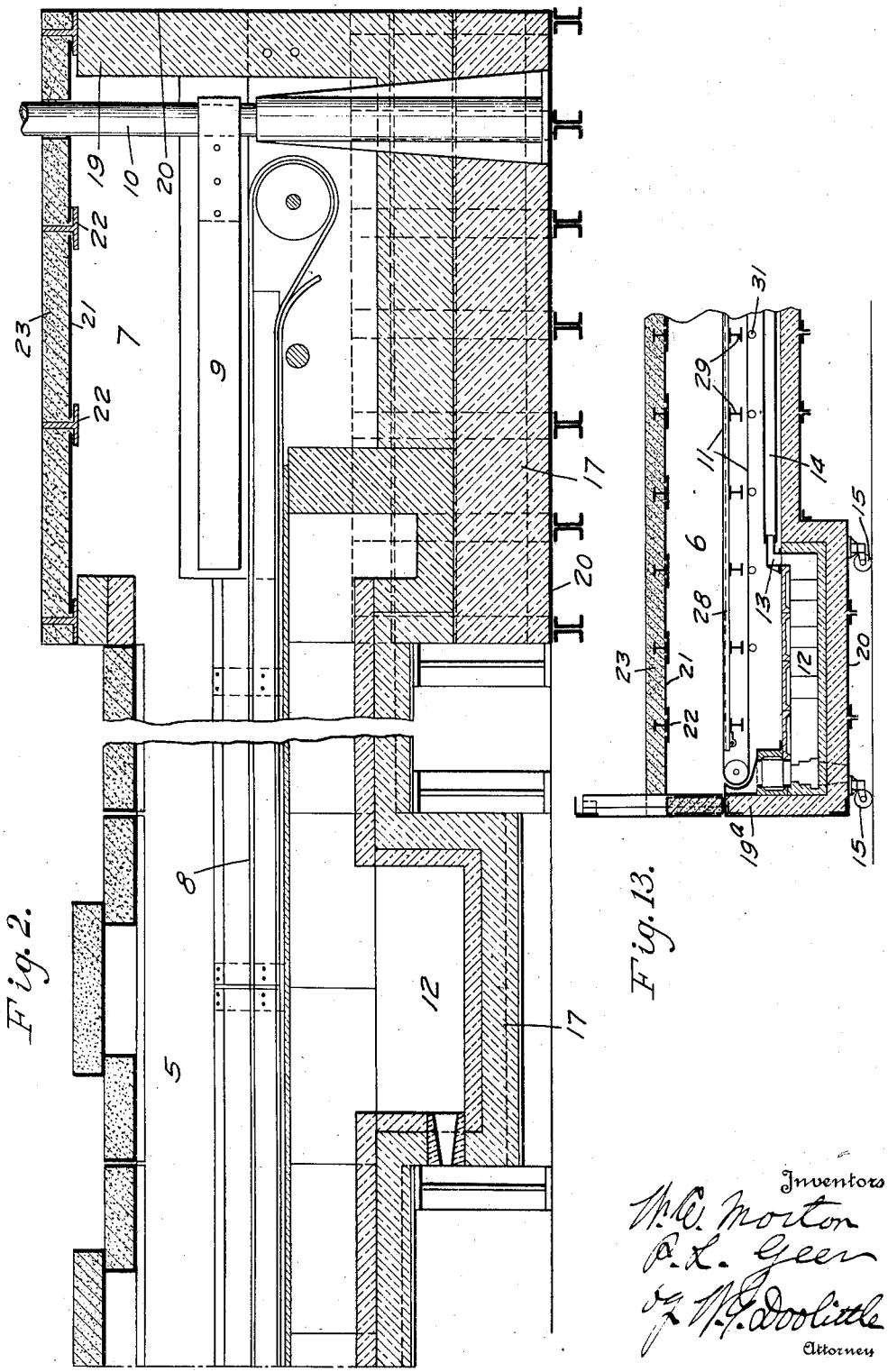

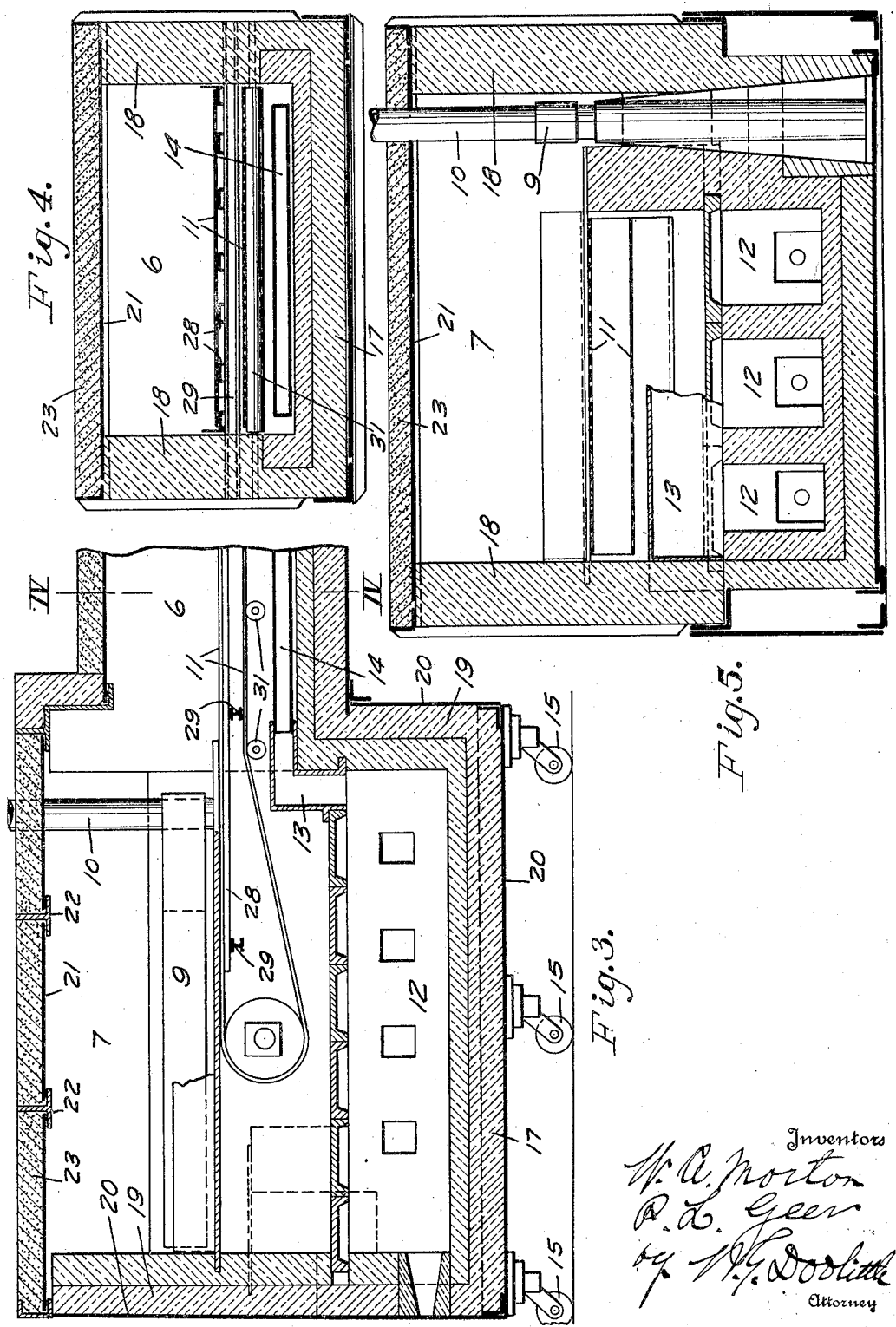

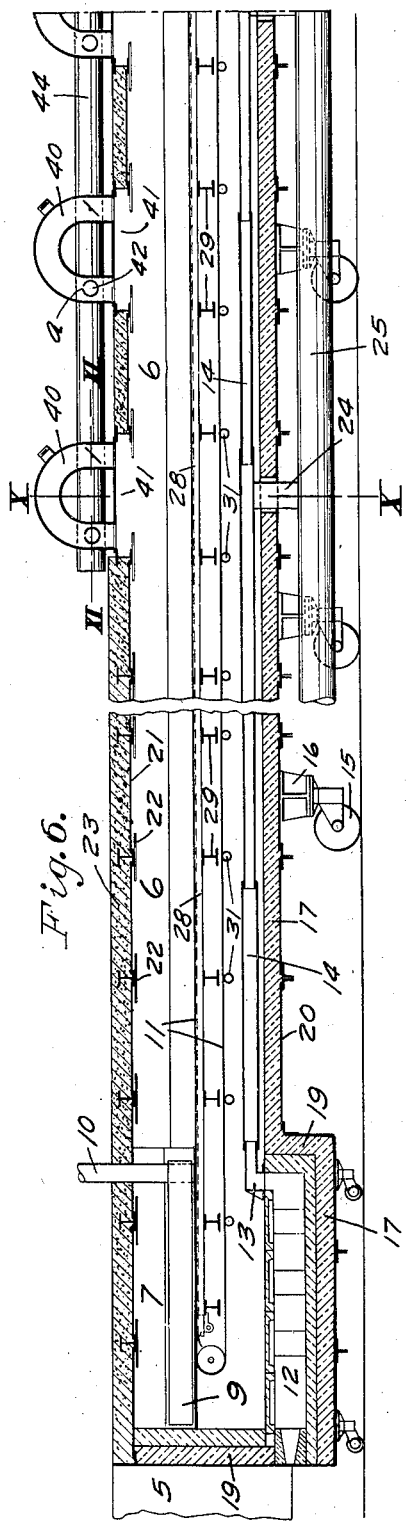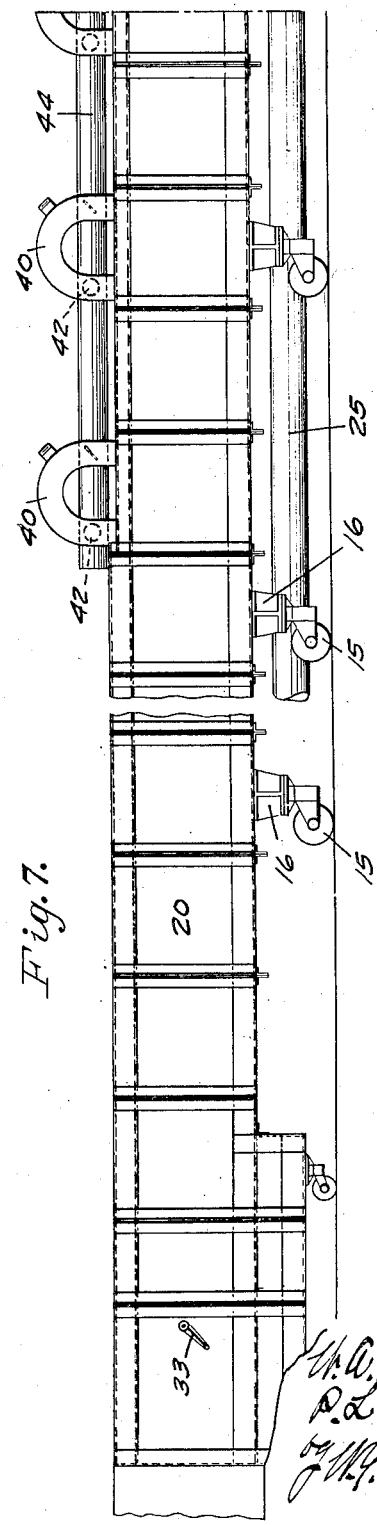

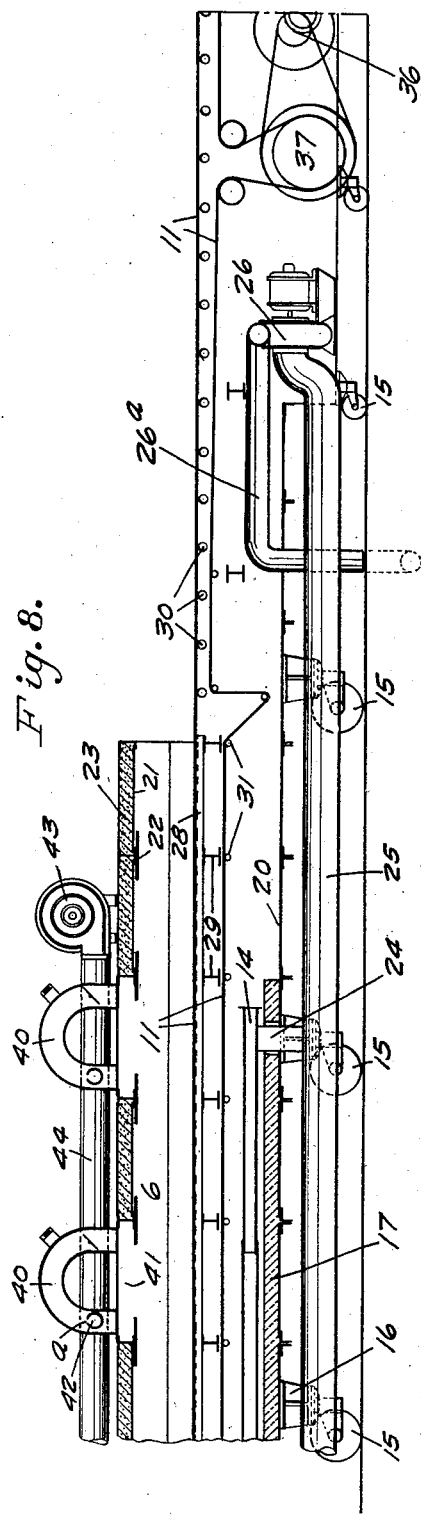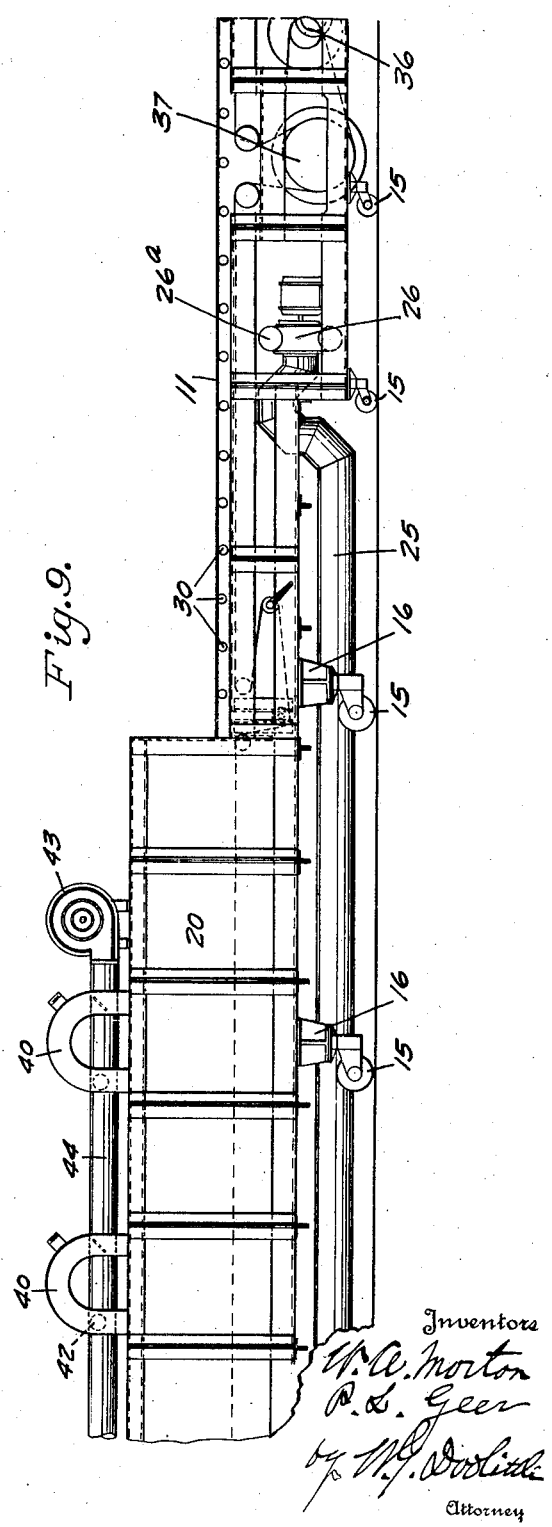

Nov. 27, 1934.   W. A. MORTON ET AL   1,982,478
METHOD OF AND APPARATUS FOR ANNEALING GLASSWARE
Filed April 11, 1927   6 Sheets-Sheet 6
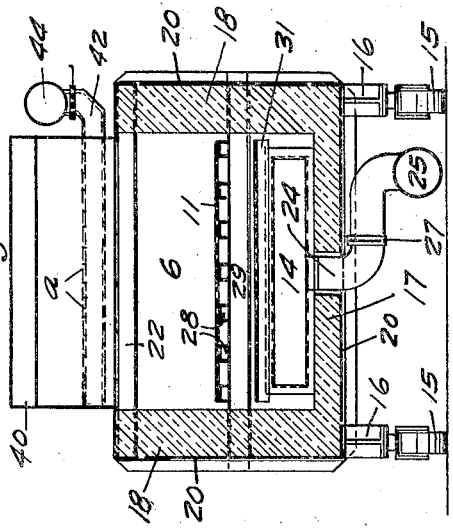
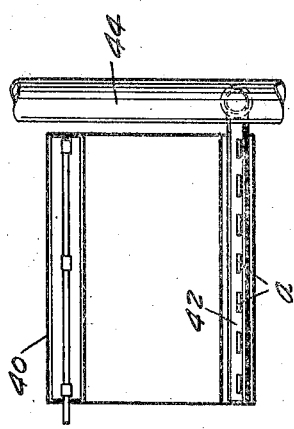
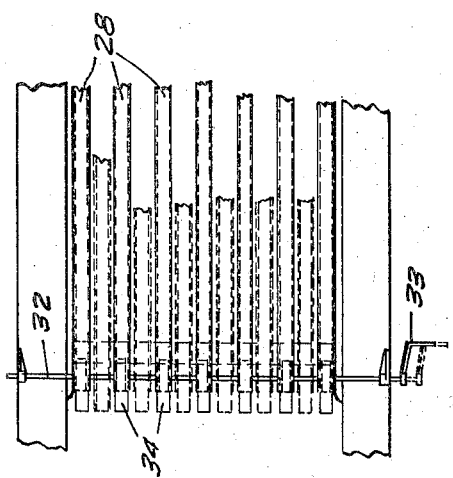

Patented Nov. 27, 1934

1,982,478

UNITED STATES PATENT OFFICE 1,982,478

METHOD OF AND APPARATUS FOR ANNEALING GLASSWARE

William A. Morton, Pittsburgh, and Paul L. Geer, Bellevue, Pa., assignors, by mesne assignments, to Amco, Incorporated, Pittsburgh, Pa., a corporation of Pennsylvania Application April 11, 1927, Serial No. 182,548

14 Claims. (Cl. 49—47)

This invention relates to a method of and an apparatus for annealing glassware and the like, and particularly to that class of inventions in which the glassware is passed through an elongated chamber or tunnel, by means of a conveyor, the temperature of the chamber or tunnel through which the ware is passed being regulated to produce the proper annealing.

The present invention embodies, in part, certain features disclosed in an application Serial No. 147,631, filed November 11, 1926.

It is well understood that glassware, after being shaped in a forming machine, must be annealed. The annealing operation as now generally practiced consists in passing the ware on a conveyor through a tunnel having a relatively high temperature at its entrance end and having a gradually decreasing temperature therein towards its discharge end.

As heretofore generally followed, it has been the practice to discharge the glassware from the forming machine onto a table, and then have operators carry the ware to the receiving end of the conveyor, designed to convey the ware through the leer, or to a ware-feeding device located near the receiving end of the leer. This method of operation causes the ware to cool, during the time required to carry it from the forming machine to the leer conveyor, to such a degree that the ware must be re-heated to a temperature equal to the temperature of the ware as it leaves the forming machine. This method is not only wasteful in the amount of fuel required to reheat, but is detrimental to the ware being treated, creating stresses in the ware and causing breakage.

In the application above referred to, one of the main objects was to provide a new and improved method of annealing that will maintain the articles to be annealed at approximately the same temperature as they leave the forming machine for a sufficient length of time to prevent the creation of stresses, and then to uniformly cool the articles. This object is also accomplished in the present invention and is carried out by transferring the glassware from the forming machine by means of a ware conveyor arranged to pass through a properly heated tunnel or the like, thus avoiding the cooling to which the ware has heretofore been subjected prior to its introduction into the annealing tunnel.

Our present invention, in addition to being directed to certain improvements in the features covered by the said application, contemplates a new method of and apparatus for annealing the glassware as it is conveyed through the main tunnel of the leer.

Among the objects of our invention are, to provide a method of annealing that will produce more satisfactory annealing of the glassware and at a considerable saving in cost than other methods heretofore followed; to provide a new and improved method of and means for regulating the temperature of the tunnel for cooling the ware, particularly as it approaches the discharge end of the main annealing tunnel; and to provide means for maintaining an approximately uniform air pressure within the main tunnel, whereby the ware being annealed is not subjected to objectionable air currents.

Further objects are, the provision of an independent main heating flue, for conveying the heated gases or the heating medium from the combustion chamber, located within the main tunnel of the leer but unattached to the walls of the tunnel to permit an independent expansion and contraction thereof; to provide, in connection with said flue, means for withdrawing a quantity or volume of the heating medium therefrom at a predetermined point in the flue; and to provide means for withdrawing heated air from the tunnel for the purpose of reducing the temperature of the withdrawn air and then returning the reduced temperature air to the tunnel.

Other objects of our invention will be disclosed or become apparent from a consideration of the description following in connection with the accompanying drawings.

In the accompanying drawings, which illustrate an embodiment of our invention:

Fig. 1 is a horizontal sectional view, particularly showing the forward or receiving end of the leer and the transfer chamber interposed between the main leer tunnel and the auxiliary tunnel;

Fig. 2, a vertical longitudinal sectional view, the section being taken on line II—II of Fig. 1;

Fig. 3, a view similar to Fig. 2, the section being taken on line III—III of Fig. 1;

Fig. 4, a cross sectional view taken on line IV—IV of Fig. 3;

Fig. 5, a vertical sectional view taken on line V—V of Fig. 1;

Fig. 6, a part longitudinal sectional and a part elevational view, particularly showing a portion of the leer rearwardly of the corresponding sectional view of Fig. 3;

Fig. 7, a side elevational view, showing the portion of the leer shown by Fig. 6;

Fig. 8, a part sectional and a part elevational view, particularly showing the rear portion of the leer structure and the conveyor driving mechanism;

Fig. 9, a side elevational view of that portion of the leer shown by Fig. 8;

Fig. 10, a detail vertical sectional view taken on line X—X of Fig. 6;

Fig. 11, a detail horizontal section taken on line XI—XI of Fig. 6;

Fig. 12, a detail plan showing a portion of the conveyor supporting bars and means for adjusting the ends thereof laterally with respect to the leer; and Fig. 13, a detail longitudinal view of a modified construction omitting the auxiliary tunnel.

As illustrated and as preferred, the leer construction includes a feeding-in or auxiliary tunnel 5, a main tunnel 6, and an intermediately disposed ware transfer chamber 7. Tunnel 5 is designed to be positioned adjacent a ware forming machine, not shown, and to contain a feeding-in ware conveyor 8, upon which the glassware is conveyed through tunnel 5 and passed onto a ware transfer mechanism including a revoluble member 9 carried on a rotatable vertically extending shaft 10. The transfer mechanism is located in chamber 7 and is designed to transfer the glassware from the conveyor 8 to a main ware conveyor 11 operable in the main tunnel 6. The construction and parts just described are similar to the construction and parts shown in the copending application above referred to, and, it is believed, that it is not necessary to further describe these parts nor the means for operating them.

Each of the tunnels may be heated from a common firebox or combustion chamber indicated by the numeral 12, or a separate combustion chamber may be provided for the tunnel 5.

When a single combustion chamber is employed, flues leading from the combustion chamber to the tunnel 5 may be provided; a transversely extending header 13 in open communication with the combustion chamber being employed for passing the products of combustion or the heating medium from the combustion chamber to a main heating flue 14.

The annealing leer structure as a whole is designed to be mounted on rollers or wheels, so that it may be moved into the desired operative position in the plant relative to glass making apparatus employed. As shown, we have provided rollers 15 carried by structural members 16, the latter extending under the leer and entering into the metallic framework employed in the leer construction. The bottom, side and end walls of the leer structure, indicated generally by the numerals 17, 18 and 19, are formed of suitable brick or furnace material, and may be of any preferred construction, said walls being preferably covered by a metallic sheeting 20.

The top wall or roof of the structure preferably includes metallic sheet material 21, suitable structural steel members 22, and a mass of some suitable heat retaining material indicated by 23.

The ware conveyor 11 of an endless belt type is perforated to expose a maximum portion of the bottom wall 17 and flue 14 to the ware and is disposed in the leer a considerable distance above the bottom wall or floor 17 thereof to form a temperature equalizing chamber for diffusing the ascending convection currents before passing through the conveyor and around the ware. The main heating flue 14 extends under both strands or flights of the conveyor from the header 13, located in the combustion chamber beyond the critical annealing range, to a desired point located towards the discharge end of the main tunnel 6, see Fig. 8. Attention is called to the fact that the heating flue 14 is entirely independent of the furnace walls, thus allowing for an independent expansion and contraction thereof.

For the purpose of withdrawing desired quantities of the heating medium from the main flue 14, in order to aid in controlling the heat temperature of the tunnel, we provide a series of depending flues or passages 24 in communication with the said flue and with a pipe 25 leading from an exhaust fan 26. Dampers 27 are provided in flues 24. Exhaust fan 26 is also designed to draw the heating medium or heated gases through flue 14, and 26a designates an exhaust pipe through which the spent heated gases are discharged.

While any suitable means may be employed for supporting the ware carrying strand of the endless conveyor 11, as well as return strand, we have provided for this purpose a series of longitudinally extending members in the form of channels 28 and a series of transverse members 29, the latter extending across the tunnel and supported in the side walls thereof, a series of rollers 30 for the upper strand or flight, and a series of rollers 31 for the return strand of the conveyor. At the ware receiving end of the conveyor, means are provided for imparting a slight transverse horizontal or shifting movement to the supporting members 28 for the purpose of distributing the wear on the conveyor. These means are particularly shown by the detail view, Fig. 12, and, as illustrated, they include a threaded shaft 32 having an operating handle 33 and a plurality of members 34 mounted thereon. By providing the means for shifting or changing the position of the supports 28, it will be apparent that the contacting portions of the conveyor therewith will be altered, thus preventing contact and wear always in the same lines.

The conveyor 11 is driven by suitable means of the usual or any preferred type located near the discharge end of the tunnel. We have illustrated diagrammatically in Figs. 8 and 9 suitable driving mechanism 36, said mechanism also including a take-up mechanism 37 for the conveyor located at one side of the drive pulley of mechanism 36.

The rollers 31 above mentioned are preferably disposed directly under the transverse members 29. This arrangement will provide, in effect, vertically extending baffles in the space between the upper face of the heating flue 14 and the conveyor supporting means, thus preventing a continuous movement of air currents through the said space adjacent the ware conveyor and will aid in forming heat zones of gradually diminishing temperature.

An important feature of the present invention resides in the method and means for controlling or regulating the temperature of the main annealing tunnel and, in addition to the provision of the means for withdrawing the desired quantities of the heating medium from the main heating flue, we provide means at predetermined points along the tunnel for effecting a withdrawal of the heated tunnel air, cooling the air, and returning the cooled air to the tunnel. This step in our method of annealing may be accomplished by providing means including a series of domes or chambers disposed at desired points along the roof of the main tunnel and in communication with the interior thereof, valves or dampers for controlling the flow of air from the main tunnel through the domes, and means for creating a circulation of the tunnel air from the tunnel proper into the chambers and from the chambers back into the tunnel.

As illustrated and as preferred, the means just above referred to include a series of domes or chambers 40, preferably formed of some suitable sheet metal and of U-shape in cross section, disposed on the roof of the tunnel and in communication therewith through ports 41 in the roof. Each dome structure is provided with a transversely extending pipe 42 having a series of small orifices a formed therein to permit of the introduction of air in the form of air jets into the domes. Atmospheric air for this purpose is passed to the several orificed pipes 42 from a blower 43 through a pipe 44.

It will be noted that by the means shown for withdrawing, at predetermined points towards the discharge end of the tunnel, regulable quantities of the heated gases or the heating medium from the main heating flue, we are enabled to reduce the temperature of the tunnel and the temperature of the ware being passed through the tunnel. These means and this step in our method, taken in connection with the means and the step of reducing the temperature of the heated tunnel air by withdrawing, at predetermined points, air from the tunnel, cooling it, and then returning the air reduced in temperature back into the tunnel, provide progressively falling temperature zones through which the ware being annealed is passed, and a highly satisfactory annealing of the ware is accomplished.

The construction illustrated, and our invention provides for, heated air zones, varying in temperature, that entirely surround the glass articles being annealed, thus insuring an effective and satisfactory annealing of the articles, due to the rapid equalization of temperature throughout the articles being annealed.

In the usual muffle tunnel leers, after the air of the tunnel is heated, a pressure differential exists as between the roof and the floor of the tunnel, positive at the top and negative below, causing the heated air to flow from the upper portions of the tunnel and cold air to flow in under the ware being annealed, thus producing an unsatisfactory annealing of the articles. In our invention, this serious trouble is eliminated by reason of the approximately constant and positive internal air pressure maintained in the tunnel.

In the modified form of our invention shown by Fig. 13, we omit the ware feeding-in or auxiliary tunnel 5 and employ a construction in which the ware is introduced to the main tunnel 6, by any suitable means not shown, through a door controlled opening formed in the front wall 19a of the leer. It is evident that the ware may be introduced from the side of the receiving end of the leer as well as through the front wall, as shown by Fig. 13.

What we claim is:

1. The method of annealing glassware which consists in passing the ware through a tunnel, heating the tunnel by passing a current of heated gases through the interior thereof, and regulating the temperature of said tunnel towards its discharge end while maintaining a predetermined pressure within the tunnel by withdrawing a volume of heated tunnel air from the tunnel and cooling it by introducing thereto atmospheric air and then passing the said commingled air increased in volume back into the tunnel, whereby a regulated tunnel air pressure in excess of atmospheric pressure is maintained.

2. The method of annealing glassware which consists in passing the ware through a tunnel, heating the tunnel by passing a current of heated gases through the interior thereof, and regulating the temperature of said tunnel towards its discharge end by withdrawing a volume of said heated gases at a predetermined point in the path of travel of the gases through the tunnel, and withdrawing a volume of the heated tunnel air from the tunnel for cooling it by introducing thereto atmospheric air and then passing the said commingled air back into the tunnel increased in volume, whereby a regulated tunnel air pressure in excess of atmospheric pressure is maintained.

3. In a leer for annealing glassware, an annealing tunnel, a longitudinally extending heating flue disposed within the tunnel adjacent the bottom thereof, said flue being unattached to the tunnel whereby the flue is independently expansible relatively to the tunnel.

4. In a leer for annealing glassware, an annealing tunnel, a longitudinally extending heating flue disposed within the tunnel adjacent the bottom thereof, said flue being unattached to the tunnel whereby the flue is independently expansible relatively to the tunnel, an exhaust flue in communication with the heating flue, and means for causing a heating medium to flow through the heating flue and the exhaust flue.

5. In a leer for annealing glassware, an annealing tunnel, a fire-box below and in advance of the receiving end of the tunnel, a transversely extending flue in communication with the fire-box, a longitudinally extending heating flue attached to the said transverse flue disposed within the tunnel, said heating flue being unattached to the tunnel whereby the flue is independently expansible relative to the tunnel, and means for causing a heating medium to flow through the heating flue.

6. In a leer for annealing glassware, an annealing tunnel, a heating flue within the tunnel disposed adjacent the floor thereof, and means for withdrawing heated air from the top of the tunnel and cooling the withdrawn air by introducing thereto cooling air and returning the commingled air to the tunnel in sufficient volume to maintain a pressure above atmospheric pressure in the tunnel.

7. In a leer for annealing glassware, an annealing tunnel, a heating flue within the tunnel disposed adjacent the floor thereof, and means for withdrawing heated air from the top of the tunnel and cooling the withdrawn air by introducing thereto cooling air and returning the commingled air to the tunnel in sufficient volume to maintain a pressure above atmospheric pressure in the tunnel, said means including a dome in communication with the top of the tunnel.

8. In a leer for annealing glassware, an annealing tunnel, a heating flue within the tunnel disposed adjacent the floor thereof, and means for withdrawing heated air from the top of the tunnel and cooling the withdrawn air by introducing thereto cooling air and returning the commingled air to the tunnel in sufficient volume to maintain a pressure above atmospheric pressure in the tunnel, said means including a dome in communication with the top of the tunnel, and a fan for forcing air currents into the dome.

9. In a leer for annealing glassware, an annealing tunnel, a heating flue within the tunnel disposed adjacent the floor thereof, an air cooling chamber at the top of the tunnel, ports in the roof of the tunnel communicating with the cooling chamber, a valve in the chamber, an orificed pipe in the chamber, a fan, and an air pipe leading from the fan to the said orificed pipe arranged to effect a withdrawal of heated air from the top of the tunnel and return it thereto mixed with cooler air to lower the temperature of the tunnel.

10. A leer for glassware including an annealing tunnel, a heating flue disposed within the tunnel adjacent the floor thereof, means for causing a heating medium to flow through said flue, means disposed at intervals longitudinally of the flue for withdrawing quantities of the heating medium therefrom, and tunnel air cooling means disposed above the roof of the tunnel at intervals longitudinally of the tunnel and in communication with the interior thereof.

11. In a leer for annealing glassware, an annealing tunnel, an endless ware conveyor having both strands in said tunnel with the upper strand thereof transporting the ware, a continuous longitudinally extending heating flue beneath the conveyor for the passage of a heating medium therethrough, exhaust means adjacent to the tunnel communicating with the flue to regulate the temperature in said flue at intervals to vary the temperature of the ware in the tunnel, means for admitting a thermally conditioned cooling fluid at spaced intervals along the tunnel in advance of the discharge end thereof to cool the ware, and means for initially heating the conveyor to receive the ware at the charging end at substantially the annealing temperature of the ware, including a fluid passage extending in front of the conveyor.

12. In a leer for annealing glassware, an annealing tunnel, an endless ware conveyor having both strands in said tunnel with the upper strand thereof supporting the ware, a heating flue beneath the conveyor for the passage of a heating medium therethrough, cooling means above the conveyor, means communicating with the heating flue and other means communicating with the cooling means for controlling the heating and cooling mediums at spaced intervals to regulate the temperature of the ware by reducing the volume of gases flowing in the heating flue and independently regulating the temperature and pressure of the tunnel air surrounding the ware.

13. In a device for annealing glassware, an annealing tunnel, a ware conveyor operable in said tunnel, a longitudinally extending heating flue for the annealing tunnel and its conveyor, a ware delivery tunnel communicating with the annealing tunnel, a conveyor operable in the ware delivery tunnel, heating means including a combustion chamber and a transversely extending heating flue beneath the ware delivery conveyor, and means for regulating the heat at intervals in said annealing tunnel to provide an annealing gradient along the ware conveyor, said longitudinally extending flue in communication with the said transversely extending flue.

14. The method of annealing glassware which comprises moving the ware through a horizontal tunnel and while so moving variably subjecting the ware to a heating medium from below the ware and at spaced intervals to create upwardly moving convection currents of different heating intensities and regulably cooling the ware by subjecting it to variable quantities of atmospheric air introduced to the ware in a plane above the ware and at spaced intervals to create downwardly moving cooling air currents through the ware.

WILLIAM A. MORTON.
PAUL L. GEER.